(12) United States Patent
Chan

(10) Patent No.: US 8,792,203 B2
(45) Date of Patent: Jul. 29, 2014

(54) METHOD AND A DEMODULATOR FOR DEMODULATING A POSITION ERROR SIGNAL FROM A READBACK SERVO SIGNAL

(71) Applicant: Agency for Science, Technology and Research, Connexis (SG)

(72) Inventor: Kheong Sann Chan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/684,129

(22) Filed: Nov. 21, 2012

(65) Prior Publication Data

US 2013/0128376 A1     May 23, 2013

(30) Foreign Application Priority Data

Nov. 21, 2011  (SG) ............................... 201108624-6

(51) Int. Cl.
*G11B 5/596*  (2006.01)
*G11B 5/09*   (2006.01)
*G11B 20/10*  (2006.01)

(52) U.S. Cl.
USPC ......................................... 360/77.11; 360/39

(58) Field of Classification Search
None
See application file for complete search history.

(56) References Cited

U.S. PATENT DOCUMENTS

2005/0007690 A1*  1/2005  Wong et al. ................ 360/77.06

\* cited by examiner

*Primary Examiner* — Daniell L Negron
(74) *Attorney, Agent, or Firm* — Wolf, Greenfield & Sacks, P.C.

(57) ABSTRACT

According to embodiments of the present invention, a method for demodulating a position error signal from a readback servo signal having a first frequency associated with a first servo track of a storage medium and a second frequency associated with a second servo track adjacent to the first servo track is provided. The method includes sampling the readback servo signal at successive time instants to provide a sequence of samples, computing a Discrete Fourier Transform based on the sequence of samples, and providing a measurement indicative of the position error signal based on the Discrete Fourier Transform. According to further embodiments of the present invention, a demodulator is also provided.

16 Claims, 9 Drawing Sheets

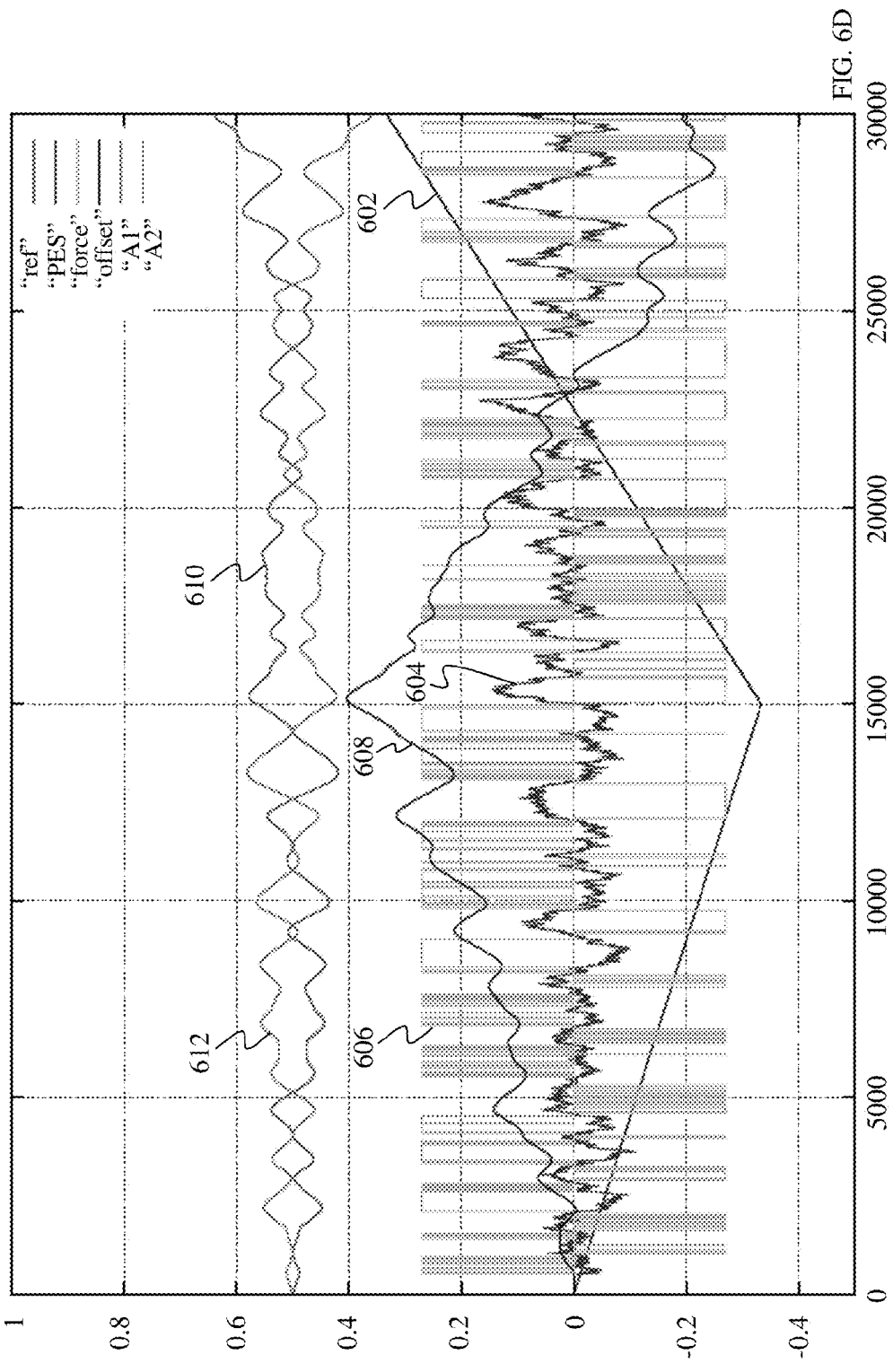

METHOD AND A DEMODULATOR FOR DEMODULATING A POSITION ERROR SIGNAL FROM A READBACK SERVO SIGNAL

CROSS-REFERENCE TO RELATED APPLICATION

This application claims the benefit of priority of Singapore patent application No. 201108624-6, filed 21 Nov. 2011, the content of it being hereby incorporated by reference in its entirety for all purposes.

TECHNICAL FIELD

Various embodiments relate to a demodulator and a method for demodulating a position error signal.

BACKGROUND

Electronic devices, including mobile computing and/or communication devices, are becoming smaller thereby driving the weight and size of data storage devices down, while requiring large storage capacity in the terabyte range and low power consumption. An increasing storage capacity would require the need for increased precision in tracking the movement of the read/write head.

Data storage devices, such as hard disk drives (HDDs), employ servo systems for tracking and controlling the movement of the read/write head. Conventional servo systems employ embedded servo where the servo information runs radially from the inner diameter (ID) to the outer diameter (OD) of the disc in a series of "servo wedges" interspersed with data. Therefore, the servo information is only detected when the read/write head moves over these servo wedges. In between the servo wedges, no servo information is received by the head. Conventional servo systems typically employ ABCD servo-burst-signal pattern, from which the position error signal (PES) is determined. In systems employing the ABCD servo-burst-signal pattern, position information is derived, for example, from the relative amplitudes of the A burst to the B burst. Furthermore, conventional servo systems also employ frequency servo schemes for PES demodulation, where the position information is derived from the relative amplitudes of one frequency to another frequency of a servo signal.

FIG. 1A shows a general schematic block diagram for a conventional servo control system 100. The servo controller 106 is the heart of the system 100 that provides a control signal to the plant 110. Plant input noise $d_i$ is injected at summer 108 and could include electronics noise in the circuits of the system 100. The plant 110, in a hard disk drive (HDD), embodies the VCM (voice coil motor) and arm which control the position of the head (e.g. read/write head). Plant output noise $d_o$ is injected into the system 100 at summer 112 before the signal y is compared to the reference signal, ref., at summer 102, and includes vibrations in the system due to windage, NRRO (non-repeatable run-out) and external shock and vibe. The reference signal compared at summer 102 represents the signal the controller 106 is attempting to follow and could be an offset of the head due to a drift or disturbance. The signal $pes_t$ is the true position error signal representing the actual difference between the track center, and the head position. The true PES signal, $pes_t$, is contaminated or affected with additional noise n at summer 104 before it is fed as input into the controller 106, closing the servo control loop. The source of noise n at summer 104 could be due to all the usual sources of noise in a recording system such as electronics noise, thermal noise, or media noise. On adding this noise to $pes_t$, the pes signal that drives the controller 106 is obtained.

SUMMARY

According to an embodiment, a method for demodulating a position error signal from a readback servo signal having a first frequency associated with a first servo track of a storage medium and a second frequency associated with a second servo track adjacent to the first servo track is provided. The method may include sampling the readback servo signal at successive time instants to provide a sequence of samples, computing a Discrete Fourier Transform based on the sequence of samples, and providing a measurement indicative of the position error signal based on the Discrete Fourier Transform.

According to an embodiment, a demodulator for demodulating a position error signal from a readback servo signal having a first frequency associated with a first servo track of a storage medium and a second frequency associated with a second servo track adjacent to the first servo track is provided. The demodulator may include a sampling circuit configured to sample the readback servo signal at successive time instants to provide a sequence of samples, and a computing circuit configured to compute a Discrete Fourier Transform based on the sequence of samples, and further configured to provide a measurement indicative of the position error signal based on the Discrete Fourier Transform.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 6D shows a plot of results corresponding to a demodulated position error signal (PES) with servo control and with data layer noise, according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of a method are analogously valid for a device, and vice versa.

In the context of various embodiments, the articles "a", "an" and "the" as used with regard to a feature or element includes a reference to one or more of the features or elements.

As used herein, the term "and/or" includes any and all combinations of one or more of the associated listed items.

Various embodiments relate to a data storage device or system having a dedicated servo layer employing a dual frequency servo scheme. The servo layer may include servo information. Various embodiments employ frequency servo schemes for position error signal (PES) demodulation, where the position information may be derived from the relative amplitudes of one frequency of a servo signal to another frequency of the servo signal. In the context of various embodiments, the servo layer may be arranged on a same side as a data recording layer on a disk, e.g. a platter, such that information from the servo layer and the data layer may be read and/or processed together.

Various embodiments relate to a demodulator and a method for demodulating a position error signal in the frequency domain, for example based on Discrete Fourier Transform (DFT), for example using an approach employing a windowed DFT, e.g. a sliding windowed DFT.

Figure 4:
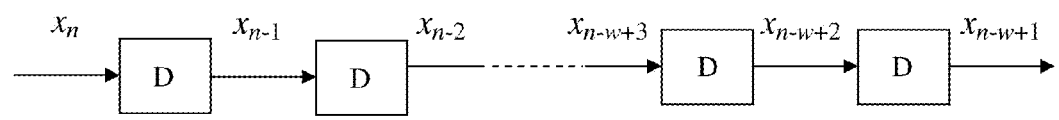
FIG. 4 shows an illustration of a sliding window tap-delay line, according to various embodiments.

In one implementation of the DFT, FFT algorithm may be employed for implementing the DFT quickly, where the FFT may offer the fastest way to implement the DFT for general inputs. In embodiments where the input has a specific format, for example where the input to the DFT comes from a tap-delay line, e.g. as shown in FIG. 4 and to be described later, in a non-limiting example, the DFT of a sliding window of the samples $x_{n-w+1}$ to $x_n$ may be continuously updated using the formulations to be described later. Without the condition of a tap-delay line, the FFT algorithm may offer a suitable approach. With the pre-condition of a tap-delay line input (e.g. a sliding window), then the updates of the DFT may be faster, being O(N), as compared to O(N log N) for the FFT algorithm, where N is the window length and "O" is the big O notation as generally used in Mathematics to describe the limiting behavior of a function when the argument/input of the function tends towards a particular value or infinity. Therefore, the sliding window update approach may be employed, rather than the FFT algorithm, based on the tap-delay line input. In addition, the embodiment based on the DFT update has the benefit that where only a particular frequency bin (subscript k of $X_k$) is required, it may not be necessary to compute the DFT at all the other frequencies. In contrast, with the FFT, all frequency bins need to be computed, and not just a practicular frequency bin (e.g. frequency bin 12 only).

In other words, the FFT is a complex algorithm for calculating the DFT in a general situation, while the sliding window DFT may be employed to calculate the DFT in the embodiment when the input to the DFT comes from a tap-delay line (or sliding window). FFT is more general and is O(N log(N)), while sliding window DFT may be implemented when the input comes from a tap delay line and is O(N).

Various embodiments further relate to an efficient dual frequency position error signal (PES) demodulator. Various embodiments may provide an efficient low complexity approach to compute the PES in the digital servo-control loop that may be implemented in the system on chip (SoC) of a dual frequency dedicated servo system.

In various embodiments, position information, for example in the form of position error signal (PES), may be extracted from a readback servo signal and used as input to the servo controller for controlling the head (e.g. read/write head) of a data storage device (e.g. a hard disk drive (HDD)). In various embodiments, the position information or PES may be extracted from the readback servo waveform by means of a PES demodulator. The PES demodulator may be implemented as part of a servo control loop of the data storage device. Various embodiments may enable simplification of the demodulator, thereby reducing the area requirement and power consumption of the SoC.

In various embodiments, the PES demodulator may employ a Discrete Fourier Transform (DFT) on the readback servo signal, where the PES may be extracted or computed from the DFT. In one embodiment, the PES demodulator may employ a sliding window Discrete Fourier Transform (DFT).

In general, a head-positioning servomechanism is provided in a data storage device, e.g. a hard disk drive (HDD), which acts as a control system. The control system may position the head (e.g. read/write (R/W) head) which is mounted on an actuator over a desired data track of a storage medium and reposition the head from one data track to another.

In a HDD servo control system, the position error signal (PES), and therefore the position of the head relative to the center of the desired data track, may be sensed and used by the servo system to generate the appropriate commands to the actuator, which in turn moves the head in an effort to reduce the position error. PES is a signal proportional to the relative difference of the positions of the centre of the head and the nearest track centre. Therefore, PES may provide an indication of the position of the head relative on the storage medium, for example the position of the head relative to a data track, and whether the head is positioned at the centre of the data track (on track) or shifted relative to the centre of the data track (off track) and the magnitude of the shift, such that the position of the head may then be adjusted.

Figure 1A:
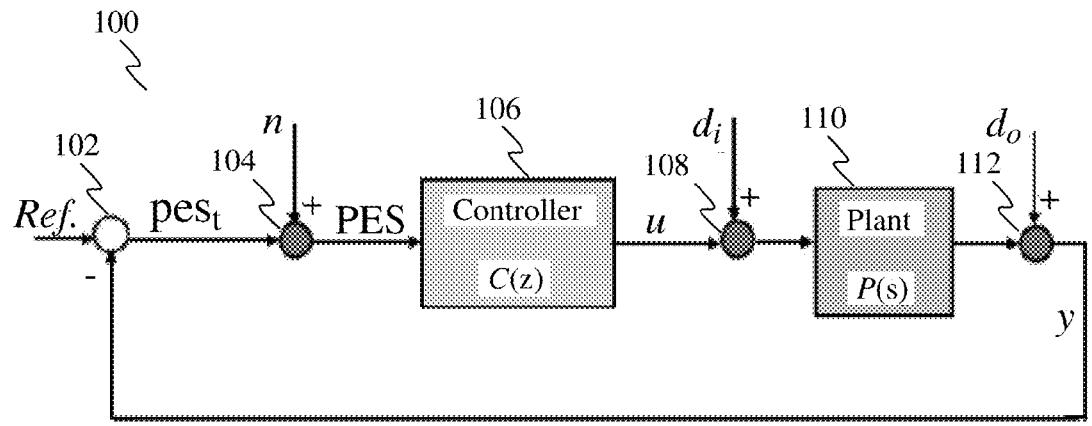
FIG. 1A shows a general schematic block diagram of a conventional servo control system.
Figure 1B:
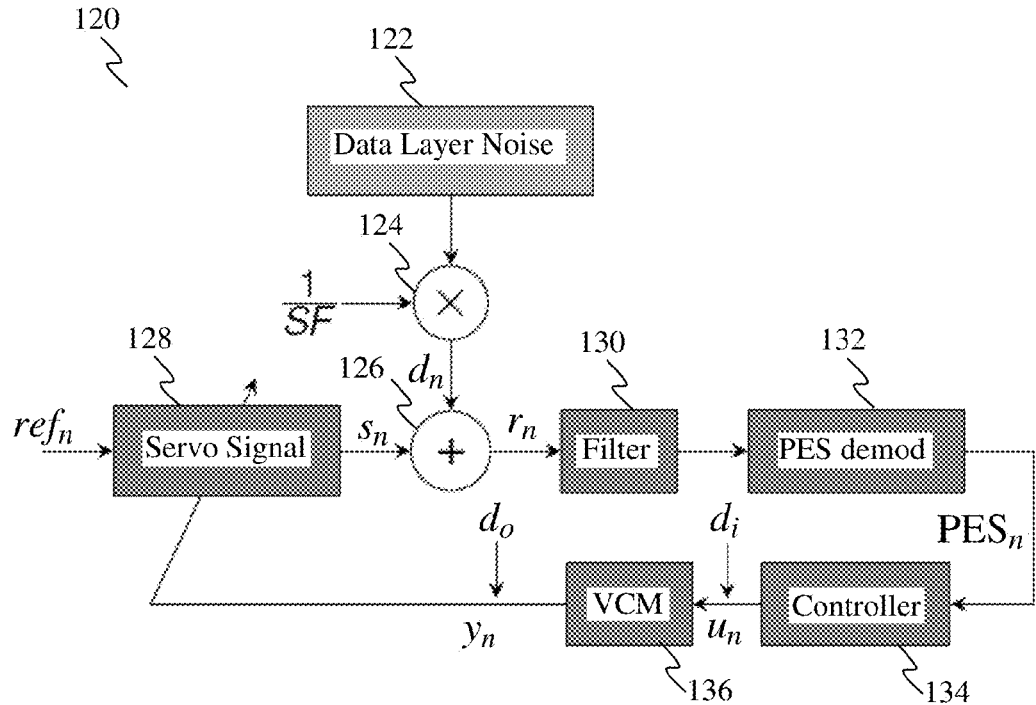
FIG. 1B shows a schematic block diagram of a servo control system, according to various embodiments.

FIG. 1B shows a schematic block diagram of a servo control system 120, according to various embodiments. The system 120 receives a signal in the form of data layer noise 122 (which is data layer signal but which is considered as noise by the servo system), which is received by a multiplication circuit 124, which also receives an input, being a constant scaling factor 1/SF, where SF<1, for multiplication of the signals. The scaling factor is employed to account for the fact that the data layer is closer to the reader and produces a stronger signal than the servo layer. The output, $d_n$, models the data layer signal and is added to $s_n$, the servo signal 128, at summer (or summing circuit) 126. The servo signal 128 models the servo layer signal. As the data layer is closer to the reader of a head (e.g. read/write head) than the servo layer, it is multiplied by a scaling factor 1/SF.

The output, $r_n$, of the summer 126 is provided to a filter 130 which separates the data signal $d_n$ from the servo signal, $s_n$. In one embodiment, the filter 130 may be a bandpass filter (BPF). The output from the filter 130 is then provided to a PES demodulator 132 to perform extraction or demodulation in order to provide the position error signal (PES), $PES_n$. Subsequently, a controller 134 receives the PES, and then outputs a signal, $u_n$, which together with another signal, $d_i$, being the VCM input noise, are provided to a voice coil motor (VCM) 136. The VCM 136 may drive an actuator which controls the positioning of a head (e.g. read/write head) in a data storage device. The output, $y_n$, of the VCM 136 is fed-back to the servo actuator which controls the position of the head in the servo signal generating model 128. The output $y_n$ may include the VCM output noise, $d_o$. $d_i$ and $d_o$ correspond to those illustrated in FIG. 1A. This block of the servo control system 120 may generate a simulated servo signal that may be used for testing the servo control loop. One difference between the servo control system 120 and the conventional servo control system 100 (FIG. 1A) is that in the servo control system 120, processing is done on a sample-by-sample basis, and that the VCM position is updated each sample. In the conventional servo control system 100, processing is done on a block-by-block basis and the VCM position is updated over each servo-control wedge. Sample-by-sample updating may be enabled by a dedicated servo system and the continuous presence of servo information, as compared to the sporadic presence of servo information in an embedded servo system. Another difference is with respect to the types of noise in the dedicated servo, where the noise at summer 104 (FIG. 1A) primarily consists of the noise $d_n$ coming from the data layer summed at summer 126 (FIG. 1B).

In a dedicated servo implementation, one disk surface (servo layer) is dedicated to store the position data referred to as servo data or servo signal. The servo layer may be a buried layer arranged beneath the data recording layer. Further, the servo layer and data recording layer may be put or arranged on the same side or same plane, and they may be read and/or processed together; this may also be referred to as dedicated servo. In various embodiments, there may be multiple (e.g. at least two) layers of magnetic media on a single surface, where one layer is dedicated to servo and another layer dedicated to data. The data layer may be arranged above the servo layer, thereby being closer to the head than the servo layer. In contrast, conventionally, one surface of the magnetic media is dedicated to hold the servo, with no data being stored on this surface. In the context of various embodiments, the servo layer and the data recording layer are separate layers or distinct layers where the signals from the servo layer and the data layer may be read together at the same time. The signals from the servo layer and the data layer may be read by a single head. The servo layer may have a perpendicular or a longitudinal magnetization orientation for providing magnetic information for determining the location of the head in relation to the storage medium. The servo information is provided on the servo layer distinct from the data recording layer so as to allow continuously available servo readback to enable continuous or continual position feedback thereby providing continual location detection without utilizing any of the recording layer for location detection. The dedicated servo may provide higher positioning accuracy through continual location determination, while also removing the servo sectors/tracks from the recording layer, thereby increasing surface utilization of the storage space in the recording layer and further increasing the data recording density by increasing the track positioning accuracy.

Figures 2A, 2B:
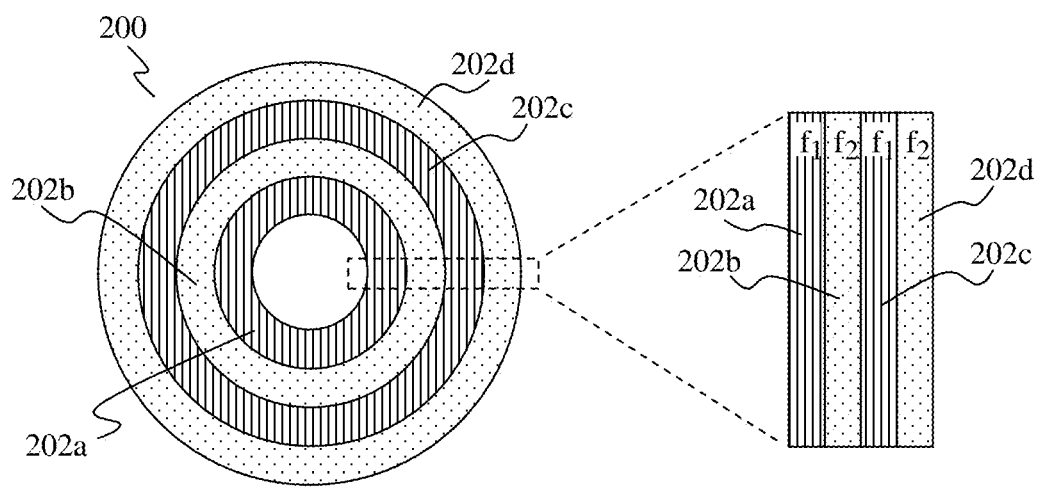
FIG. 2A shows a schematic top view of a portion of a servo layer, according to various embodiments.
FIG. 2B shows a schematic top view of a section of the servo layer of the embodiment of FIG. 2A.

The dedicated servo layer may have a continuous track structure having a plurality of servo tracks in a concentric arrangement. Adjacent servo tracks may be alternately assigned different frequency signals, having respective frequencies $f_1$ and $f_2$, as illustrated in FIGS. 2A and 2B for a portion of the servo layer 200 towards its inner diameter, showing four servo tracks 202a, 202b, 202c, 202d. In this configuration, the head of the data storage device may be positioned in between two adjacent tracks (e.g. 202a and 202b; 202b and 202c), for example at the boundary of the two adjacent tracks, and may be able to obtain a readback servo signal having frequencies $f_1$ and $f_2$.

In further embodiments, adjacent servo tracks may be alternately assigned different frequency signals, for example three respective frequencies, four, five or any higher number, and the head may be positioned in between any two adjacent tracks to obtain a readback servo signal having two different frequencies.

Therefore, in various embodiments of a dedicated servo system, each servo track has a single frequency. The position error signal (PES) may be extracted by means of DFT applied to, for example a dual frequency based servo signal.

While not shown in FIGS. 2A and 2B, there may be small breaks in the servo tracks 202a, 202b, 202c, 202d for the sector address mark (SAM) and Gray code information, which contain addressing information. Providing this information may minimize any error that may lead to writing information on the wrong track, which may lead to a failure. In various embodiments, the SAM and/or Gray information may be written or provided on both the data layer and the servo layer and such information is not over-written. Therefore, the remaining portions of the servo layer contain servo information, e.g. frequency servo or ABCD burst pattern.

In order that the invention may be readily understood and put into practical effect, particular embodiments will now be described by way of examples and not limitations, and with reference to the figures.

Figure 3A:
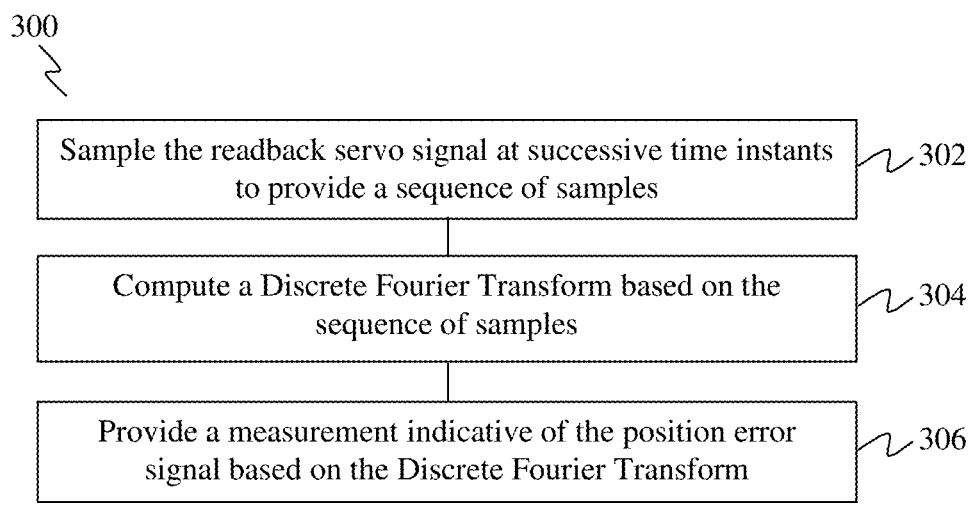
FIG. 3A shows a flow chart illustrating a method for demodulating a position error signal from a readback servo signal, according to various embodiments.

FIG. 3A shows a flow chart 300 illustrating a method for demodulating a position error signal from a readback servo signal having a first frequency associated with a first servo track of a storage medium and a second frequency associated with a second servo track adjacent to the first servo track, according to various embodiments.

At 302, the readback servo signal is sampled at successive time instants to provide a sequence of samples. In other words, the readback servo signal may be sampled at a plurality of time instants so that the readback servo signal may be represented by a plurality of discrete values.

At 304, a Discrete Fourier Transform (DFT) is computed based on the sequence of samples.

At 306, a measurement indicative of the position error signal (PES) is provided based on the Discrete Fourier Transform.

In various embodiments, a window of a predetermined length may be applied to the sequence of samples to form a windowed sequence of samples and the Discrete Fourier Transform may be computed based on the windowed sequence of samples. In various embodiments, the window has a predetermined length that is less than the length of the sequence of samples. In other words, the Discrete Fourier Transform is computed based on a portion of the sequence of samples, where some samples may not be utilised in the determination of the DFT.

In various embodiments, a sliding window of a predetermined length may be applied to the sequence of samples to form respective windowed sequences of samples, wherein a respective Discrete Fourier Transform may be computed based on each respective windowed sequence of samples, and subsequently a respective measurement indicative of the position error signal may be provided based on the respective Discrete Fourier Transform.

In other words, a window of a predetermined length may be applied to the sequence of samples to form a windowed sequence of samples and the Discrete Fourier Transform, from which the PES may be subsequently determined, may be computed based on the windowed sequence of samples. The window may then be moved or shifted, for example by one time instant, and another DFT may be computed, from which another PES may be determined. This may be repeated as the sliding window is successively moved or cycled through the sequence of samples. Therefore, PES may be determined for different time instants based on the DFTs computed for different time instants based on the respective positions of the sliding window.

In various embodiments based on the sliding window approach, for two consecutive windowed sequences of samples of the respective windowed sequences of samples, a respective Discrete Fourier Transform of a succeeding windowed sequence of samples of the two consecutive windowed sequences of samples may be computed based on a respective Discrete Fourier Transform computed based on a preceeding windowed sequence of samples of the two consecutive windowed sequences of samples. In other words, the DFT for the succeeding windowed sequence of samples need not necessarily be computed based on the succeeding windowed sequence of samples of the two consecutive windowed sequences of samples, but rather based on or updated from the Discrete Fourier Transform computed based on a preceeding windowed sequence of samples. Therefore, a new DFT, for a succeeding windowed sequence of samples, may be updated from the previous DFT computation of a preceeding windowed sequence of samples. When the window slides over by one sample or one time instant, the summation of the new (succeeding) DFT may substantially be written in terms of the summation of the previous (preceeding) DFT. Thus, with a complex multiplication and two complex additions, the new DFT sequence may be obtained in terms of the old DFT sequence. This saves a lot of computation, thereby providing computational efficiency.

In various embodiments, at 306, a difference between an absolute value of a component of the Discrete Fourier Transform corresponding to the first frequency and an absolute value of a component of the Discrete Fourier Transform corresponding to the second frequency may be computed to provide the measurement indicative of the position error signal (PES). In other words, the modulus or absolute value of the component of the Discrete Fourier Transform of the readback servo signal corresponding to the first frequency and the modulus or absolute value of the component of the Discrete Fourier Transform of the readback servo signal corresponding to the second frequency may be determined and the difference of these absolute values may be computed to provide the PES.

In the context of various embodiments, the component of the Discrete Fourier Transform may mean the coefficient of the Discrete Fourier Transform.

Figure 3B:
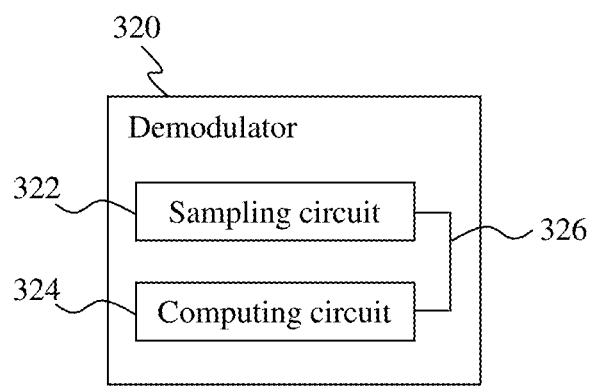
FIG. 3B shows a schematic block diagram of a demodulator for demodulating a position error signal from a readback servo signal, according to various embodiments.

FIG. 3B shows a schematic block diagram of a demodulator 320 for demodulating a position error signal from a readback servo signal having a first frequency associated with a first servo track of a storage medium and a second frequency associated with a second servo track adjacent to the first servo track, according to various embodiments. The demodulator 320 includes a sampling circuit 322 configured to sample the readback servo signal at successive time instants to provide a sequence of samples, and a computing circuit 324 configured to compute a Discrete Fourier Transform based on the sequence of samples, and further configured to provide a measurement indicative of the position error signal based on the Discrete Fourier Transform. In FIG. 3B, the line represented as 326 is illustrated to show the relationship between the sampling circuit 322 and the computing circuit 324, which may include electrical coupling and/or mechanical coupling, for example in terms of the arrangements of the sampling circuit 322 and the computing circuit 324.

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hardwired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a 'circuit' in accordance with an alternative embodiment.

In the context of various embodiments, the demodulator 320 may include a memory which is for example used in the processing carried out by the demodulator 320. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, the computing circuit 324 may be configured to apply a window of a predetermined length to the sequence of samples to form a windowed sequence of samples, and further configured to compute the Discrete Fourier Transform based on the windowed sequence of samples.

In various embodiments, the computing circuit 324 may be configured to apply a sliding window of a predetermined length to the sequence of samples to form respective windowed sequences of samples, further configured to compute a respective Discrete Fourier Transform based on each respective windowed sequence of samples, and further configured to provide a respective measurement indicative of the position error signal based on the respective Discrete Fourier Transform.

In various embodiments based on the sliding window approach, for two consecutive windowed sequences of samples of the respective windowed sequences of samples, the computing circuit 324 may be configured to compute a respective Discrete Fourier Transform of a succeeding windowed sequence of samples of the two consecutive windowed sequences of samples based on a respective Discrete Fourier Transform computed based on a preceeding windowed sequence of samples of the two consecutive windowed sequences of samples.

In various embodiments, the computing circuit 324 may be configured to compute a difference between an absolute value of a component of the Discrete Fourier Transform corresponding to the first frequency and an absolute value of a component of the Discrete Fourier Transform corresponding to the second frequency.

In various embodiments, the demodulator 320 may form part of a data storage device such as a hard disk drive (HDD). For example, the demodulator 320 may be part of a servo control system in the HDD.

In the context of various embodiments, the measurement may be expressed as $$PES_m = |X_k^m|_{k=f_1} - |X_k^m|_{k=f_2} \quad \text{(Equation 1)},$$

where
PES$_m$ is the position error signal at time instant m,
$|X_k^m|_{k=f_1}$ is the absolute value of the Discrete Fourier Transform component of the readback servo signal corresponding to frequency f$_1$, at time instant m,
$|X_k^m|_{k=f_2}$ is the absolute value of the Discrete Fourier Transform component of the readback servo signal corresponding to frequency f$_2$, at time instant m,
f$_1$ is the first frequency,
f$_2$ is the second frequency.

In the context of various embodiments, m may be n; n+1; . . . ; n-w+1, where w is the window length.

In the context of various embodiments, the readback servo signal may be a continuous servo signal. In other words, the servo layer may provide a continuous servo signal.

In the context of various embodiments, the readback servo signal is obtained or extracted from a dedicated servo layer of a storage medium, which is separate from the data recording layer of the storage medium. In one embodiment, the servo layer is arranged below the data recording layer, with the data recording layer being proximal to the head and the servo layer being distal to the head. The readback servo signal may be obtained by means of a head of the data storage device. The servo layer provides servo information or positioning signals for servo control.

In the context of various embodiments, the servo layer may include a plurality of concentric tracks for holding the servo information. Each servo track may be assigned or associated with a single frequency signal. Adjacent servo tracks may be assigned different frequencies. Repeated servo tracks may be assigned alternate frequencies. In the context of various embodiments, adjacent servo tracks mean tracks that are arranged side-by-side. In various embodiments, two adjacent servo tracks share a common boundary. As illustrated by the non-limiting examples of FIGS. 2A and 2B, two frequencies may be laid out side by side to define the servo tracks (and possibly, but not necessarily, the data tracks too), with the head trying to fly down the center (boundary) of the two tracks, or off-center.

In the context of various embodiments, the term "head" may include a magnetic head. In addition, the "head" may refer to the read/write head for reading/writing information or data from/to a storage medium. The head includes a reader and a writer. The head is positioned over a storage medium and the reader may read signal or information from the storage medium and the writer may write information to the data layer of the storage medium.

In various embodiments, a sliding window Discrete Fourier Transform (DFT) may be computed or generated as discrete Fourier transform at the points sampled from a tap-delay line as illustrated in FIG. 4.

In various embodiments, a sequence of samples may be represented as $$\ldots, x_{-3}, x_{-2}, x_{-1}, x_0, x_1, x_2, x_3, \ldots, x_n, x_{n+1}, \ldots$$

By implementing a window or a sliding window of a predetermined length, w, for example at the time instant n, a windowed sequence of samples including w samples, may be formed as $$\{x_{n-w+1}, x_{n-w+2}, x_{n-w+3}, \ldots, x_{n-2}, x_{n+1}, x_n\},$$

A DFT sequence, X$_k$, may then be performed on the windowed sequence of samples. At the time instant n, the DFT may be computed as follows $$X_k^n = \sum_{i=0}^{w-1} x_{n-i} e^{-\frac{j2\pi ik}{w}}. \quad \text{(Equation 2)}$$

In addition, at the succeeding time instant n+1, the DFT may be computed as follows $$X_k^{n+1} = \sum_{i=0}^{w-1} x_{n+1-i} e^{-\frac{j2\pi ik}{w}}. \quad \text{(Equation 3)}$$

A sliding window Discrete Fourier Transform (DFT) approach may provide computational efficiency as the windowed sequences for two successive time instances, e.g. at n−1 and n; and at n and n+1, contain essentially identical elements.

For a DFT of size w, if the w-DFT of x$_n$ is X$_k$, then $$x_{n-p} \leftrightarrow X_k e^{-\frac{j2\pi kp}{w}}. \quad \text{(Equation 4)}$$

Equation 4 shows the DFT of a circularly shifted sequence. If a sequence is circularly shifted by one sample (to the left), then the DFT value X$_k$ becomes $$X_k \rightarrow X_k e^{\frac{j2\pi k}{w}}. \quad \text{(Equation 5)}$$

Hence, the DFTs of two successive windowed sequences, $X_k^{n+1}$ and $X_k^n$, each of length w, $x_{n+1}$ and $x_{n-w+1}$ may be related as:

$$X_k^{n+1} = e^{-\frac{j2\pi k}{w}} X_k^n + (x_{n+1} - x_{n-w+1}), \quad \text{(Equation 6)}$$

Therefore, Equation 6 may be used for updating the sliding window DFT.

Equation 6 allows updating of the DFT sequence X$_k$ at time (n+1) in terms of X$_k$ at time (n). Equation 6 shows that the update equation requires only one complex multiplication and two additions to be implemented per DFT point, which is less complex than O(w log w) needed using the most efficient FFT (Fast Fourier Transform) algorithms, where w is the window length of the DFT and "O" is the big O notation as generally used in Mathematics to describe the limiting behavior of a function when the argument/input of the function tends towards a particular value or infinity.

Based on Equation 6, the DFT sequence at a particular time instant (e.g. $X_k^{n+1}$) may be updated or computed based on the DFT sequence of the immediately preceeding time instant (e.g. $X_k^n$), the sample at the particular time instant whose DFT sequence is to be computed (e.g. $x_{n+1}$), and the sample at the final time instant within the window of length w (e.g. $x_{n-w+1}$).

The PES demodulator output may then be computed as the difference between the absolute value of the respective $X_k$ or the DFT components of the readback servo signal at the two frequencies of a dual frequency based servo signal employed in the data storage device. The PES may be computed based on the following equation, $$PES_m = |X_k^m|_{k=f1} - |X_k^m|_{k=f2} \quad \text{(Equation 7)},$$

where $PES_m$ is the position error signal at time instant m, $|X_k^m|_{k=f1}$ is the absolute value of the Discrete Fourier Transform component of the readback servo signal corresponding to frequency $f_1$, at time instant m, $|X_k^m|_{k=f2}$ is the absolute value of the Discrete Fourier Transform component of the readback servo signal corresponding to frequency $f_2$, at time instant m, $f_1$ and $f_2$ refer to the respective frequencies of a dual frequency based servo signal employed in a data storage device.

In various embodiments, m may be n; n+1; ... ; n-w+1, where w is the window length.

In further embodiments, the PES may be computed based on the following equation, $$PES_m = A \times (|X_k^m|_{k=f1} - |X_k^m|_{k=f2}) \quad \text{(Equation 8)},$$

where $PES_m$ is the position error signal at time instant m, $|X_k^m|_{k=f1}$ is the absolute value of the Discrete Fourier Transform component of the readback servo signal corresponding to frequency $f_1$, at time instant m, $|X_k^m|_{k=f2}$ is the absolute value of the Discrete Fourier Transform component of the readback servo signal corresponding to frequency $f_2$, at time instant m, $f_1$ and $f_2$ refer to the respective frequencies of a dual frequency based servo signal employed in a data storage device, A is a normalization factor.

In various embodiments, m may be n; n+1; ... ; n-w+1, where w is the window length.

In various embodiments, as the head may be off-set in the vertical direction relative to the storage medium, due for example to fly-height variation, the readback servo signal may correspondingly decrease when the head is further from the servo layer and the storage medium, and normalization of the servo signal may be required as otherwise the output of the servo controller may be too weak to compensate for the cross-track offset. This may then provide an improved or accurate measure of the head's cross-track position that may then be effectively used for servo control.

Using ABCD servo-burst-signal pattern as a non-limiting example, PES may be computed as (A−B)/(A+B) where A and B denote the amplitudes of two signals containing cross-track information. For example, with ABCD (or just AB) servo, A and B may be the respective amplitudes of two servo frequency bursts appropriately offset in the cross-track direction. When the head happens to be too much towards the A burst, then the A signal is stronger, and the B burst is weaker and a positive PES=(A−B)/(A+B) may be obtained, indicating the proximity of the head towards the A burst. When the head is too much towards the B burst, the inverse holds and a negative PES may be obtained, indicating the proximity of the head towards the B burst. The controller may be interested in the relative strength of (A−B), which for example may be normalized, e.g. using (A+B).

Normalization of (A−B) may be required as illustrated by the following non-limiting example. The head may be off-set in the vertical direction, due to fly-height variation. Both A and B signals may correspondingly decrease because the head may be further from the storage medium. Where (A−B) is not normalized appropriately, the output of the servo controller may be too weak to compensate for the cross-track offset. Where the head is offset vertically due to fly-height variation, then (A+B) may also correspondingly decrease in amplitude such that (A−B)/(A+B) may still give an accurate measure of the head's cross-track position that may then be effectively used for servo control.

As a non-limiting example, $f_1$ may be 30 MHz, and $f_2$ may be 40 MHz. In addition, as a non-limiting example, A may be $|X_k^m|_{k=f1} + |X_k^m|_{k=f2}$.

In various embodiments, applying a window, including a sliding window, on the sequence of samples, from which a DFT is computed may provide a simplified approach as PES may be determined from the respective components of the Discrete Fourier Transform corresponding to the frequencies associated with the servo signal. In addition, the sliding window approach may allow the DFT at a particular time instant to be updated based on the DFT of the preceeding time instant. Accordingly, the respective components of the DFT of the readback servo signal corresponding to the respective frequencies associated with the servo signal may be updated based on the respective components of the DFT at a preceeding time instant. In this approach, components of the Discrete Fourier Transform corresponding to any other frequencies may not be required to determine PES and therefore uneeded information need not be taken into consideration or computed. In contrast, by using a Fast Fourier Transform (FFT), each computation of the FFT sequence requires computation of FFT corresponding to all the samples, where all but two of which are subsequently not utilised.

Figure 5:
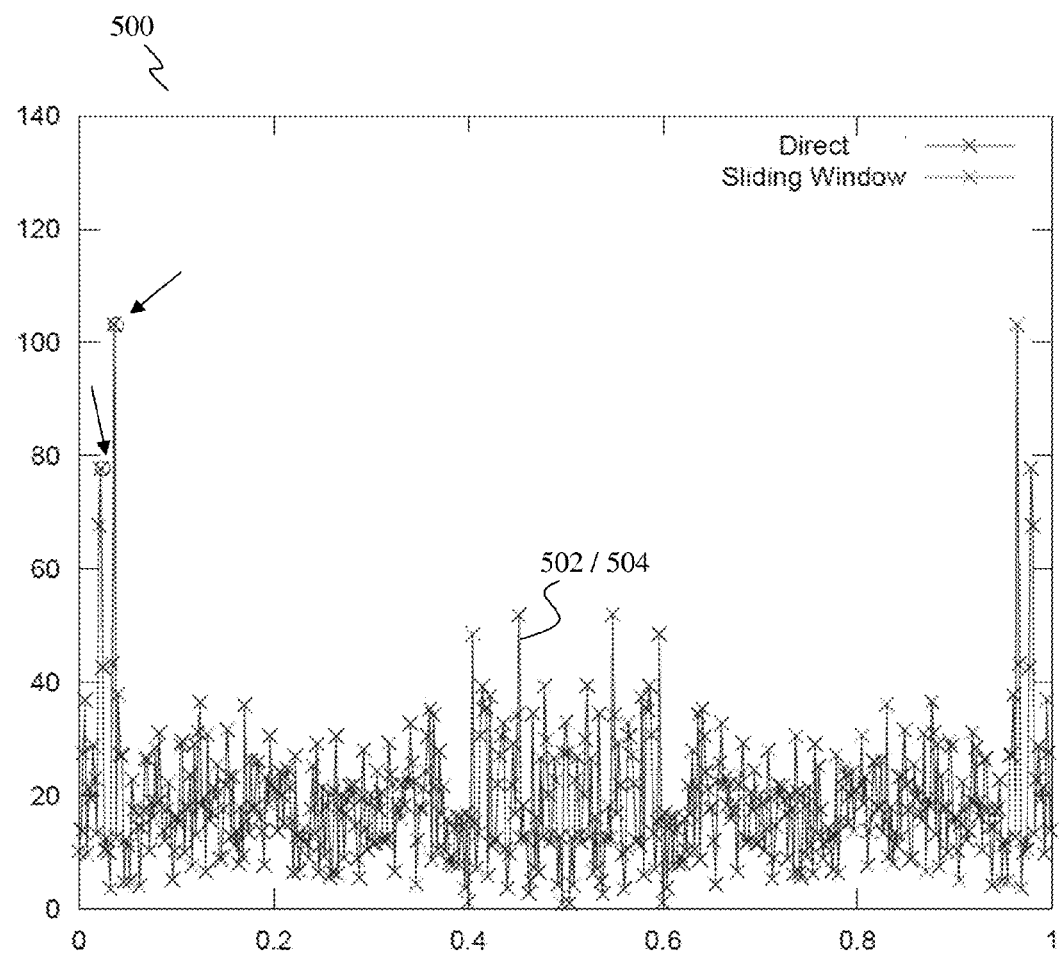
FIG. 5 shows a plot of comparison of results of the sliding window Discrete Fourier Transform (DFT) of various embodiments and a direct computational approach for extracting position error signal (PES).

FIG. 5 shows a plot 500 of comparison of results of the sliding window Discrete Fourier Transform (DFT) 502 and a direct computational approach 504 for extracting PES. As examples, the direct computational approach may be a double summation of the DFT or the FFT algorithm. The plot 500 was obtained from a simulation that computes the DFT of the readback servo signal having the data signal with the two servo frequencies. The vertical y-axis is the DFT of the readback servo signal (absolute value), and the horizontal x-axis is the normalized frequency. The DFT was computed through 2 methods: the direct method (which is slower) and the sliding window method (which is faster). The results shows that the sliding window DFT computation produces exactly the same result as the slower direct computation. As shown in FIG. 5, the results for the sliding window DFT 502 and the direct computation 504 overlap each other, in other words, the results lie on top of each other, thereby illustrating substantially perfect correlation of both sets of results.

The DFT changes with time as the head moves between the two servo tracks picking up different quantities of the two sinusoidal signals of the servo signal having respective frequencies. The plot 500 is a snap-shot of the time-evolution of the DFT at a particular time instant. At this time instant, the PES is given as the difference of the amplitude of the two frequencies PES=(A1−A2)/(A1+A2), where A1 and A2 are the amplitudes of the two frequencies, estimated from the sliding window DFT. These two frequencies are visible in the spectrum as the two spikes at around frequencies 0.04 and 0.05, which are marked with "O" and pointed at with arrows in FIG. 5.

Therefore, using a sliding window DFT approach may replace the direct DFT or direct computation approach, allowing the PES to be demodulated from the readback servo signal.

FIGS. 6A to 6D show plots of results corresponding to a demodulated position error signal (PES) with no servo control or with servo control, and with no data layer noise or with data layer noise, according to various embodiments. FIGS. 6A to 6D show the results for ref 602, PES 604, force 606, offset 608, A1 610 and A2 612. The servo control system 120 of the embodiment of FIG. 1B was used to model the signals and generate the performance plots of FIGS. 6A to 6D.

FIGS. 6A, 6B, 6C and 6D show non-limiting examples of the various signals in a continuous servo modulating system in four separate scenarios: with and without data-layer noise, and with servo control on and servo control off. In the case of these non-limiting examples, noise as injected at summer 126 (FIG. 1B) includes the unwanted signal from the data layer. In the case of these examples, a simple non-limiting example of a servo control algorithm may be implemented to demonstrate the principles described. "Servo control on" refers to the utilization of $y_n$ information within the servo signal block 128 to generate the readback signal (FIG. 1B), while servo control off refers to the non-utilization of $y_n$ information within the servo signal block 128 to generate the readback signal (FIG. 1B).

Signal 602 refers to the reference signal $ref_n$ in FIG. 1B and in the examples of FIGS. 6A, 6B, 6C and 6D, is a linear disturbance downwards until time-index 15000 followed by a sharper linear disturbance upwards until time-index 30000. Within the servo signal block 128 (FIG. 1B), there exists a time-domain summation of 2 sinusoids weighted in amplitude by the difference between the reference signal $ref_n$ and the control signal $y_n$. These amplitudes are depicted by the signals A1 610 and A2 612 in FIGS. 6A, 6B, 6C and 6D, and are determined by the difference between the $ref_n$ signal 602 and the head offset signal 608. Within the context of this simulation, the head-offset signal 608 is either zero, when servo control is off, or it is the damped response of the applied force, when servo control is turned on. Within the non-limiting context of this simulation, the force 606 applied at the VCM coil is turned on fully when the PES signal 604 exceeds a threshold, otherwise the force 606 applied is turned off. The PES signal 604 in this simulation is generated as the difference in amplitude of the two sinusoidal frequencies as estimated by the sliding window DFT as described above.

Figure 6A:
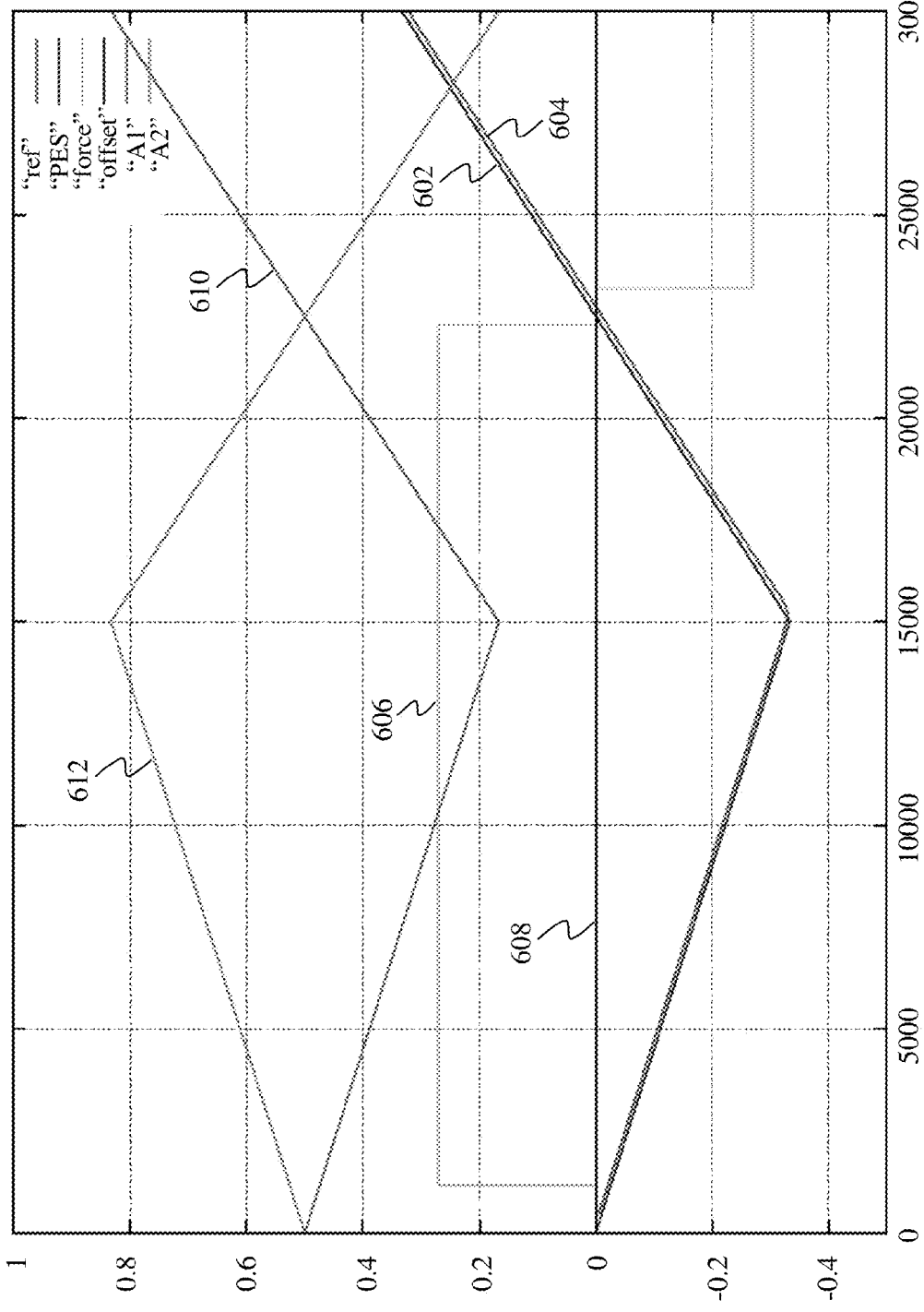
FIG. 6A shows a plot of results corresponding to a demodulated position error signal (PES) with no servo control and no data layer noise, according to various embodiments.

Given the above definitions, the working of the sliding window DFT in a simple servo-control simulation may be demonstrated. FIG. 6A shows the case with open servo loop (no control) and with no data noise injected for the computation of the PES. The open-loop means that the applied force 606 does not impact the head offset, hence the signal 608 is always zero, and the amplitudes A1 610 and A2 612 of the two sinusoids simply follow the reference signal 602. The PES signal 604 is computed from the amplitudes A1 610 and A2 612 using the sliding window DFT and is found to follow the reference signal 602 closely. The force signal 606 turns on, and pushes the head back towards the track center based on the PES signal 604, but in the case of FIG. 6A which is open-loop, this force 606 is unconnected to the head offset 608 and therefore has no bearing on the head-position.

Figure 6B:
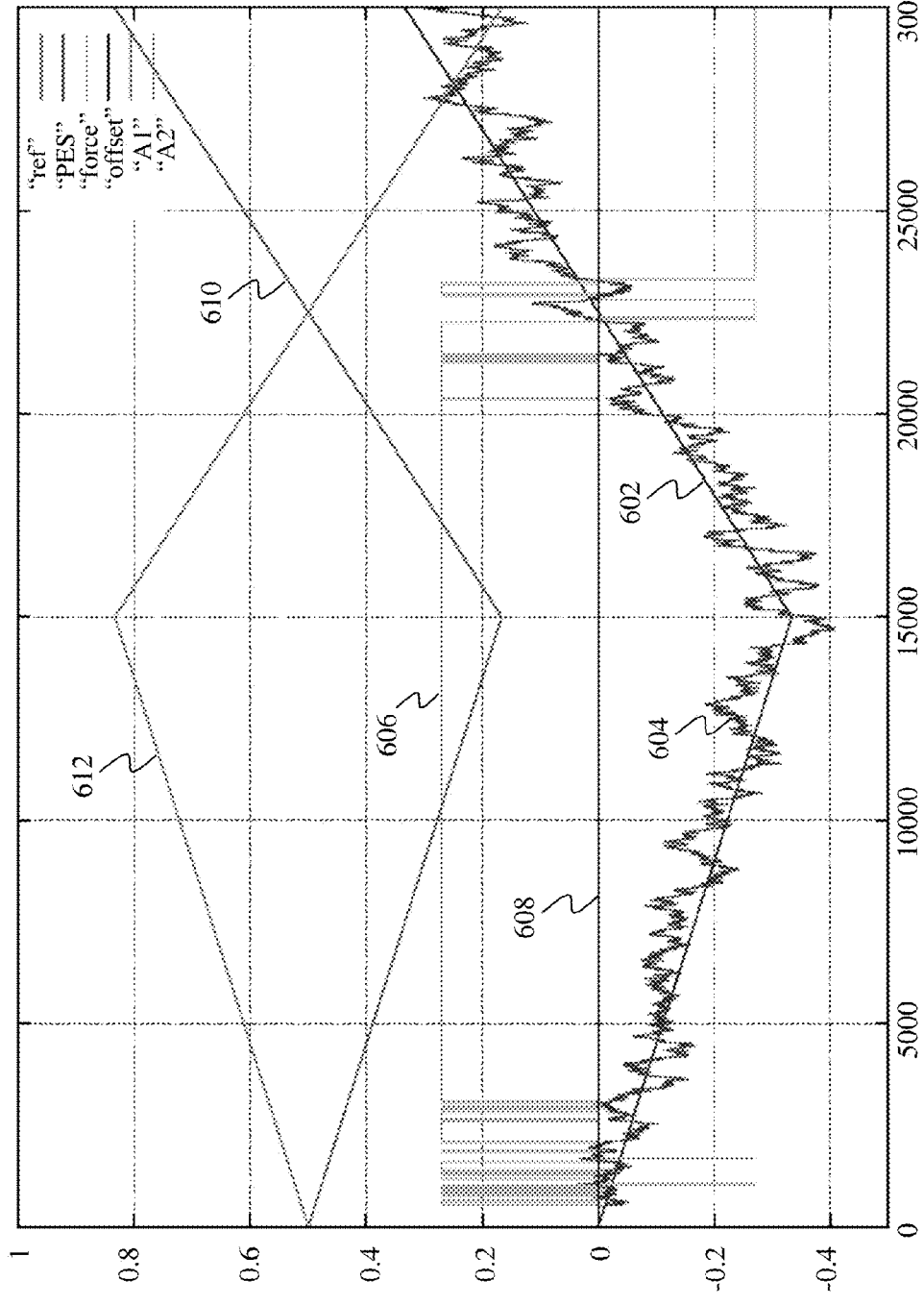
FIG. 6B shows a plot of results corresponding to a demodulated position error signal (PES) with no servo control and with data layer noise, according to various embodiments.

FIG. 6B shows what happens when the data signal, which is considered noise, is included. The PES signal 604 becomes noisier due to the presence of the data signal, and thus the force 606 applied at the VCM also becomes noisier. However the VCM force 606 is still uncoupled to the head offset 608 and thus sinusoidal amplitudes A1 610 and A2 612 follow the reference signal 602 as before. The PES 604 also follows the reference signal 602, but with noise showing that the computed PES is a noisy measure of the off-track position of the head.

Figure 6C:
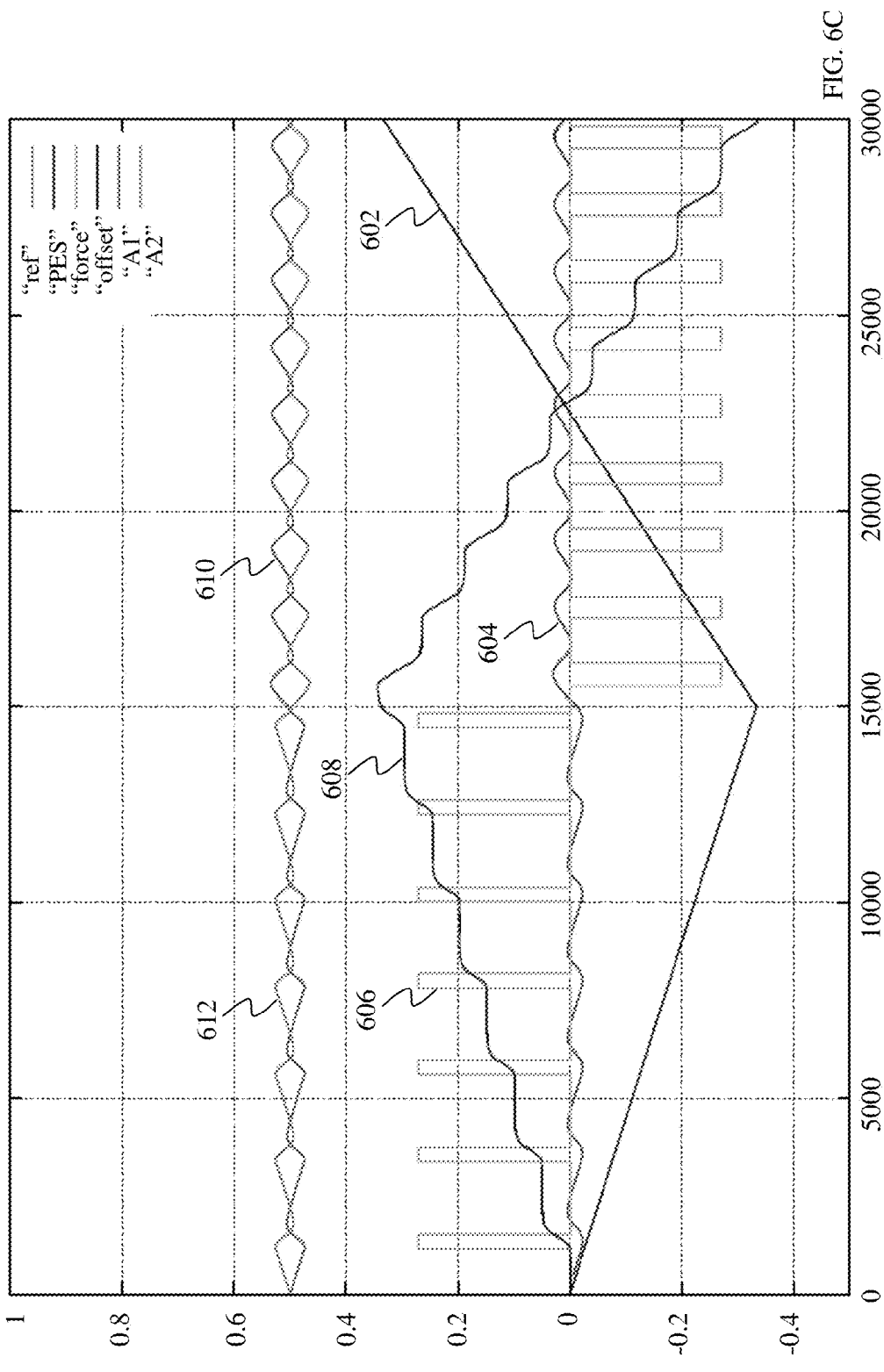
FIG. 6C shows a plot of results corresponding to a demodulated position error signal (PES) with servo control and with no data layer noise, according to various embodiments.

FIG. 6C shows the results when the servo loop is closed, in the case without data-layer noise. Under these conditions, the applied force 606 has an impact on the head offset position 608 and the head moves until it counteracts the disturbance in the reference signal 602. The head following the disturbance in an on-off manner keeps the amplitudes of the two servo sinusoids A1 610 and A2 612, both close to one half, i.e. near the track center. When the reference signal 602 turns around at time-instant 15000, the relative amplitudes of the two servo sinusoids A1 610 and A2 612 reverses and pushes the head back in the opposite direction. The larger gradient of the reference signal 602 results in the force 606 being turned on for a longer time in order to keep the head close to the reference signal 602.

FIG. 6D shows the results having both servo control on and data-layer noise on. It may be observed that the head is still able to track the reference signal 602 albeit in a more noisy manner.

These simulations demonstrate the feasibility of the approach of various embodiments using the sliding window DFT, e.g. including a windowed DFT or a sliding windowed DFT, and updating the signals every iteration instead of once per block. In the context of various embodiments, a reference to updating the signals may refer to updating of the servo continuously, which may be enabled by the presence of continuous servo information, for example as all-the-time servo (ATTS) as shown in the bottom half of FIG. 7. In the ATTS embodiment, the servo is not turned off, except possibly over the SAM and Gray information. Therefore, there is controlling (servo control) all the time, hence the term "all-the-time servo".

Figure 7:
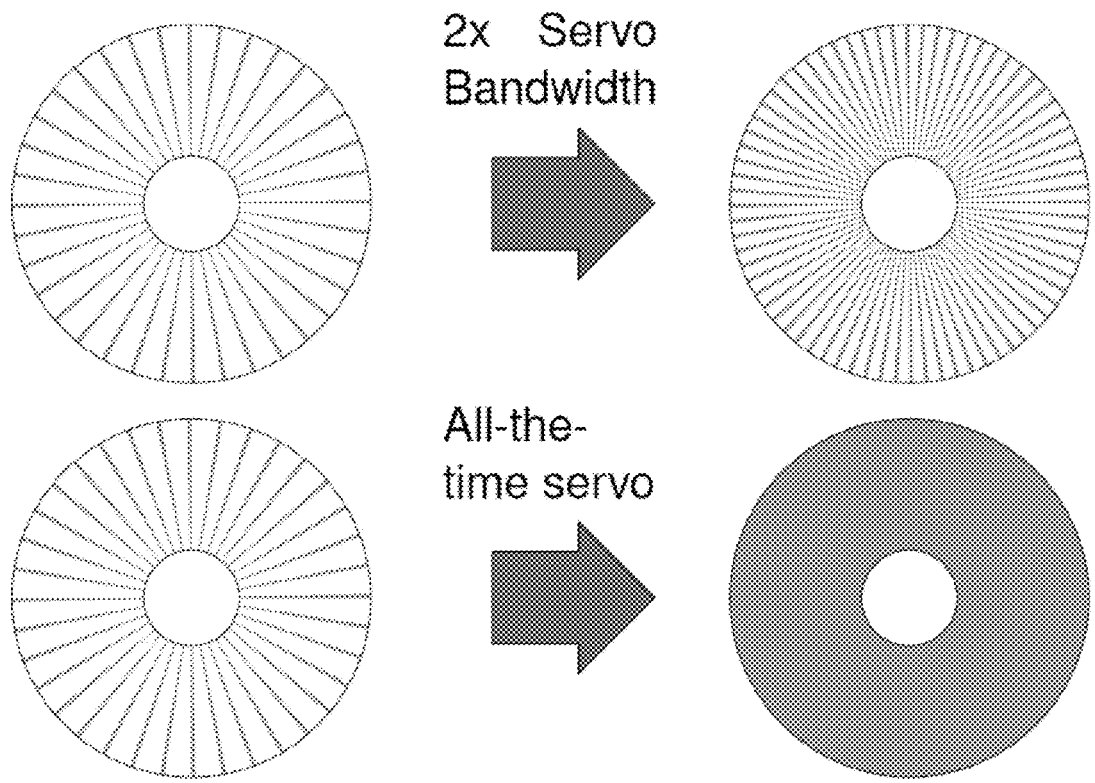
FIG. 7 shows some examples of servo patterns of a servo layer, according to various embodiments.

The approach of various embodiments may be employed to extract PES from the servo signal of a servo layer having any servo pattern, for example any continual or continuous servo pattern, and/or servo pattern having any number of servo tracks (i.e. any density or bandwidth), including all-the-time servo in which servo information is provided throughout the entire servo layer where the servo information is available all the time, thereby providing a dedicated servo system, as illustrated in FIG. 7. In the 2× servo bandwidth embodiment, the presence of continuous servo information may be used to control the head more frequently, akin to having more "spokes" (dark coloured) around the circumference, as shown in FIG. 7. There are still regions (smaller regions) in which the servo information is not actuating the head, and just fly blind, similar to embedded servo, between the spokes.

The approach of various embodiments may simplify the servo computations for the system on chip (SoC), for example including using all-the-time servo (ATTS). For example, as demonstrated by the above simulation result and the complexity of the servo demodulation scheme, only a complex multiply and two complex additions are required per sample.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for demodulating a position error signal from a readback servo signal having a first frequency associated with a first servo track of a storage medium and a second frequency associated with a second servo track adjacent to the first servo track, the method comprising:
sampling the readback servo signal at successive time instants to provide a sequence of samples;
applying a window of a predetermined length to the sequence of samples to form a windowed sequence of samples, wherein the predetermined length is less than a length of the sequence of samples;
computing a Discrete Fourier Transform based on the windowed sequence of samples; and
providing a measurement indicative of the position error signal based on the Discrete Fourier Transform.

2. The method as claimed in claim 1,
wherein the window is a sliding window of the predetermined length samples so as to form respective windowed sequences of samples;
wherein computing the Discrete Fourier Transform comprises computing a respective Discrete Fourier Transform based on each respective windowed sequence of samples, and
wherein providing the measurement comprises providing a respective measurement indicative of the position error signal based on the respective Discrete Fourier Transform.

3. The method as claimed in claim 2, wherein for two consecutive windowed sequences of samples of the respective windowed sequences of samples, computing the Discrete Fourier Transform comprises computing a respective Discrete Fourier Transform of a succeeding windowed sequence of samples of the two consecutive windowed sequences of samples based on a respective Discrete Fourier Transform computed based on a preceding windowed sequence of samples of the two consecutive windowed sequences of samples.

4. The method according to claim 1, wherein providing the measurement comprises computing a difference between an absolute value of a component of the Discrete Fourier Transform corresponding to the first frequency and an absolute value of a component of the Discrete Fourier Transform corresponding to the second frequency.

5. The method according to claim 1, wherein the measurement is expressed as:

$$PES_m = |X_k^m|_{k=f_1} - |X_k^m|_{k=f_2}$$

where
$PES_m$ is the position error signal at time instant m,
$|X_k^m|_{k=f_1}$ represents the absolute value of the Discrete Fourier Transform component of the readback servo signal corresponding to frequency $f_1$, at time instant m,
$|X_k^m|_{k=f_2}$ represents the absolute value of the Discrete Fourier Transform component of the readback servo signal corresponding to frequency $f_2$, at time instant m,
$f_1$ is the first frequency,
$f_2$ is the second frequency.

6. The method as claimed in claim 1,
wherein the window is a sliding window of the predetermined length so as to form respective windowed sequences of samples;
wherein for two consecutive windowed sequences of samples of the respective windowed sequences of samples, computing the Discrete Fourier Transform comprises computing a first Discrete Fourier Transform based on a preceding windowed sequence of samples of the two consecutive windowed sequences of samples, and further comprising computing a second Discrete Fourier Transform corresponding to a succeeding windowed sequence of samples of the two consecutive windowed sequences of samples based on the first Discrete Fourier Transform; and
wherein providing the measurement comprises providing a respective measurement indicative of the position error signal based on the first Discrete Fourier Transform and the second Discrete Fourier Transform respectively.

7. The method as claimed in claim 6, wherein computing the second Discrete Fourier Transform comprises:
performing a complex multiplication based on the first Discrete Fourier Transform; and
performing a summation based on
a sample of a succeeding windowed sequence of samples of the two consecutive windowed sequences of samples at a time instant the second Discrete Fourier Transform is to be computed, and
another sample at a final time instant within the succeeding windowed sequence of samples.

8. The method as claimed in claim 6, wherein the second Discrete Fourier Transform is computed as:

$$X_k^{n+1} = e^{\frac{j2\pi k}{w}} X_k^n + (x_{n+1} - x_{n-w+1})$$

where
$X_k^n$ is the first Discrete Fourier Transform,
$X_k^{n+1}$ is the second Discrete Fourier Transform,
$x_{n+1}$ is a sample at the time instant the second Discrete Fourier Transform is to be computed,
$X_{n-w+1}$ is a sample at the final time instant within a succeeding windowed sequence of samples of the two consecutive windowed sequences of samples,
w is the predetermined length,
k is frequency.

9. A demodulator for demodulating a position error signal from a readback servo signal having a first frequency associated with a first servo track of a storage medium and a second frequency associated with a second servo track adjacent to the first servo track, the demodulator comprising:
a sampling circuit configured to sample the readback servo signal at successive time instants to provide a sequence of samples;
a computing circuit configured to apply a window of a predetermined length to the sequence of samples to form a windowed sequence of samples, wherein the predetermined length is less than a length of the sequence of samples,
wherein the computing circuit is further configured to compute a Discrete Fourier Transform based on the windowed sequence of samples, and further configured to provide a measurement indicative of the position error signal based on the Discrete Fourier Transform.

10. The demodulator as claimed in claim 9, wherein the window is a sliding window of the predetermined length so as to form respective windowed sequences of samples, wherein the computing circuit is configured to compute a respective Discrete Fourier Transform based on each respective windowed sequence of samples, and further configured to provide a respective measurement indicative of the position error signal based on the respective Discrete Fourier Transform.

11. The demodulator as claimed in claim 10, wherein for two consecutive windowed sequences of samples of the respective windowed sequences of samples, the computing circuit is configured to compute a respective Discrete Fourier Transform of a succeeding windowed sequence of samples of the two consecutive windowed sequences of samples based on a respective Discrete Fourier Transform computed based on a preceding windowed sequence of samples of the two consecutive windowed sequences of samples.

12. The demodulator as claimed in claim 9, wherein the computing circuit is configured to compute a difference between an absolute value of a component of the Discrete Fourier Transform corresponding to the first frequency and an absolute value of a component of the Discrete Fourier Transform corresponding to the second frequency.

13. The demodulator according to claim 9, wherein the measurement is expressed as:

$$PES_m = |X_k^m|_{k=f1} - |X_k^m|_{k=f2}$$

where
$PES_m$ is the position error signal at time instant m,
$|X_k^m|_{k=f1}$ represents the absolute value of the Discrete Fourier Transform component of the readback servo signal corresponding to frequency $f_1$, at time instant m,
$|X_k^m|_{k=f2}$ represents the absolute value of the Discrete Fourier Transform component of the readback servo signal corresponding to frequency $f_2$, at time instant m,
$f_1$ is the first frequency,
$f_2$ is the second frequency.

14. The demodulator as claimed in claim 9,
wherein the window is a sliding window of the predetermined length so as to form respective windowed sequences of samples;
wherein for two consecutive windowed sequences of samples of the respective windowed sequences of samples, the computing circuit is configured to compute a first Discrete Fourier Transform based on a preceding windowed sequence of samples of the two consecutive windowed sequences of samples, further configured to compute a second Discrete Fourier Transform corresponding to a succeeding windowed sequence of samples of the two consecutive windowed sequences of samples based on the first Discrete Fourier Transform, and further configured to provide a respective measurement indicative of the position error signal based on the first Discrete Fourier Transform and the second Discrete Fourier Transform respectively.

15. The demodulator as claimed in claim 14, wherein, for computing the second Discrete Fourier Transform, the computing circuit is configured to perform a complex multiplication based on the first Discrete Fourier Transform, and further configured to perform a summation based on
a sample of a succeeding windowed sequence of samples of the two consecutive windowed sequences of samples at a time instant the second Discrete Fourier Transform is to be computed, and
another sample at a final time instant within the succeeding windowed sequence of samples.

16. The demodulator as claimed in claim 14, wherein the second Discrete Fourier Transform is computed as:

$$X_k^{n+1} = e^{\frac{j2\pi k}{w}} X_k^n + (x_{n+1} - x_{n-w+1})$$

where
$X_k^n$ is the first Discrete Fourier Transform,
$X_k^{n+1}$ is the second Discrete Fourier Transform,
$x_{n+1}$ is a sample at the time instant the second Discrete Fourier Transform is to be computed,
$X_{n-w+1}$ is a sample at the final time instant within a succeeding windowed sequence of samples of the two consecutive windowed sequences of samples,
w is the predetermined length,
k is frequency.

* * * * *